(12) United States Patent
Ishi

(10) Patent No.: US 10,632,540 B2
(45) Date of Patent: Apr. 28, 2020

(54) CUTTING INSERT, CUTTING TOOL, AND METHOD OF MANUFACTURING MACHINED PRODUCT

(71) Applicant: Kyocera Corporation, Kyoto-shi, Kyoto (JP)

(72) Inventor: Hirohisa Ishi, Omihachiman (JP)

(73) Assignee: KYOCERA CORPORATION, Kyoto-shi, Kyoto (JP)

( * ) Notice: Subject to any disclaimer, the term of this patent is extended or adjusted under 35 U.S.C. 154(b) by 18 days.

(21) Appl. No.: 15/773,190

(22) PCT Filed: Nov. 8, 2016

(86) PCT No.: PCT/JP2016/083109
§ 371 (c)(1),
(2) Date: May 3, 2018

(87) PCT Pub. No.: WO2017/082251
PCT Pub. Date: May 18, 2017

(65) Prior Publication Data
US 2018/0318936 A1   Nov. 8, 2018

(30) Foreign Application Priority Data
Nov. 9, 2015   (JP) .................................. 2015-219049

(51) Int. Cl.
*B23B 51/04* (2006.01)
*B23B 27/16* (2006.01)
(Continued)

(52) U.S. Cl.
CPC ........ *B23B 27/1607* (2013.01); *B23B 27/045* (2013.01); *B23B 27/141* (2013.01);
(Continued)

(58) Field of Classification Search
CPC ..... B23C 5/202; B23C 5/207; B23C 2200/08; B23C 2200/03; B23C 2200/123;
(Continued)

(56) References Cited

U.S. PATENT DOCUMENTS

2009/0097929 A1* 4/2009 Festeau ................... B23C 5/202
407/114
2010/0178122 A1* 7/2010 Bae ........................ B23B 51/048
408/223
(Continued)

FOREIGN PATENT DOCUMENTS

CN          102407353 A      4/2012
WO       2009142323 A1     11/2009
(Continued)

*Primary Examiner* — Nicole N Ramos
(74) *Attorney, Agent, or Firm* — Viering, Jenschura & Partner MBB

(57) ABSTRACT

A cutting insert in the present disclosure includes an upper surface, a lower surface, a side surface, and an edge. The upper surface includes a first corner part and a second corner part. The edge is located in a region which is located between the first corner part and the second corner part. The edge includes a first edge located at a side of the first corner part, a second edge located at a side of the second corner part, and a third edge located between the first edge and the second edge. The edge has a curvilinear shape being recessed toward the lower surface in a side view. Each of a radius of curvature R1 of the first edge and a radius of curvature R2 of the second edge is smaller than a radius of curvature R3 of the third edge in a side view.

20 Claims, 14 Drawing Sheets

(51) Int. Cl.
*B23B 51/00* (2006.01)
*B23B 27/14* (2006.01)
*B23B 27/04* (2006.01)
*B23B 27/22* (2006.01)

(52) U.S. Cl.
CPC ............ *B23B 27/143* (2013.01); *B23B 27/22* (2013.01); *B23B 51/00* (2013.01); *B23B 51/048* (2013.01); *B23B 2200/0471* (2013.01); *B23B 2200/0476* (2013.01); *B23B 2200/123* (2013.01); *B23B 2200/202* (2013.01); *B23B 2200/204* (2013.01); *B23B 2200/208* (2013.01); *B23B 2200/245* (2013.01); *B23B 2200/321* (2013.01)

(58) Field of Classification Search
CPC .......... B23C 2200/20; B23C 2200/203; B23C 2200/208; B23C 2200/243; B23C 2200/246; B23C 2210/123; B23C 2210/126; Y10T 409/303808; Y10T 408/905; Y10T 408/906; Y10T 408/909; Y10T 408/9095; Y10T 408/9097; Y10T 407/23; Y10T 407/235; Y10T 407/24; Y10T 407/245; B23B 2251/50; B23B 51/042; B23B 51/0488
See application file for complete search history.

(56) References Cited

U.S. PATENT DOCUMENTS

| | | | |
|---|---|---|---|
| 2010/0303563 A1* | 12/2010 | Fang | B23C 5/109 407/113 |
| 2011/0044776 A1 | 2/2011 | Ishi | |
| 2012/0045289 A1* | 2/2012 | Ishi | B23C 5/06 409/132 |
| 2012/0051855 A1 | 3/2012 | Löf | |
| 2012/0063858 A1 | 3/2012 | Onozawa et al. | |
| 2013/0022422 A1* | 1/2013 | Ramesh | B23B 51/048 408/200 |
| 2016/0288223 A1 | 10/2016 | Ishi | |

FOREIGN PATENT DOCUMENTS

| | | |
|---|---|---|
| WO | 2010137701 A1 | 12/2010 |
| WO | 2015076232 A1 | 5/2015 |

* cited by examiner

US 10,632,540 B2

CUTTING INSERT, CUTTING TOOL, AND METHOD OF MANUFACTURING MACHINED PRODUCT

CROSS-REFERENCE TO RELATED APPLICATIONS

This application is a national stage entry according to 35 U.S.C. 371 of PCT Application No. PCT/JP2016/083109 filed on Nov. 8, 2016, which claims priority to Japanese Application No. 2015-219049 filed on Nov. 9, 2015, which are entirely incorporated herein by reference.

TECHNICAL FIELD

The present disclosure relates to a cutting insert, a cutting tool, and a method of manufacturing a machined product.

BACKGROUND ART

Drills usable for a drilling process as a cutting tool have conventionally been known (for example, refer to Patent Document 1). The tool described in Patent Document 1 includes a base body (holder) having an axis, and two inserts (an inner cutting edge insert and an outer cutting edge insert) attached to the base body.

The inner cutting edge insert is different from the outer cutting edge insert in distance from the axis of the tool. Therefore, a shape of chips generated by the inner cutting edge insert is different from a shape of chips generated by the outer cutting edge insert. Specifically, the shape of the chips generated by the inner cutting edge insert extends spirally at a shorter pitch than the chips generated by the outer cutting edge insert, and the chips are likely to come together. The shape of the chips generated by the outer cutting edge insert has a longer pitch than the chips generated by the inner cutting edge insert, and the chips are less likely to come together. The shape of the chips generated by the inner cutting edge insert is different from the shape of the chips generated by the outer cutter edge insert, thus necessitating a chip discharge according to the shape. For example, when the chips generated by the outer cutting edge insert excessively extend without being divided in appropriate length, chip clogging may occur.

RELATED ART DOCUMENTS

Patent Document

Patent Document 1: International Publication No. 2010-137701

SUMMARY

A cutting insert in the present disclosure includes an upper surface, a lower surface, a side surface, and a cutting edge. The upper surface includes a first corner part and a second corner part adjacent to each other. The lower surface is located on a side opposite to the upper surface. The side surface is located between the upper surface and the lower surface. The cutting edge is located in a region which is located between the first corner part and the second corner part, and in which the upper surface intersects with the side surface. The cutting edge includes a first cutting edge located at a side of the first corner part, a second cutting edge located at a side of the second corner part, and a third cutting edge located between the first cutting edge and the second cutting edge. The cutting edge has a curvilinear shape being recessed toward the lower surface as going from each of the first corner part and the second corner part toward a midportion of the cutting edge in a side view. Each of a radius of curvature R1 of the first cutting edge and a radius of curvature R2 of the second cutting edge in a side view is smaller than a radius of curvature R3 of the third cutting edge in a side view.

A cutting tool in the present disclosure includes a bar-shaped holder extending along a rotation axis, and a cutting insert in the present disclosure described above which is attached to a front end of the holder. The holder includes a chip discharge flute extending spirally around the rotation axis in a direction from the cutting insert toward a rear end side.

A method of manufacturing a machined product in the present disclosure includes rotating a cutting tool in the present disclosure described above around the rotation axis, bringing the cutting tool being rotated into contact with a workpiece, and moving the cutting tool away from the workpiece.

EMBODIMENTS

Figure 1:
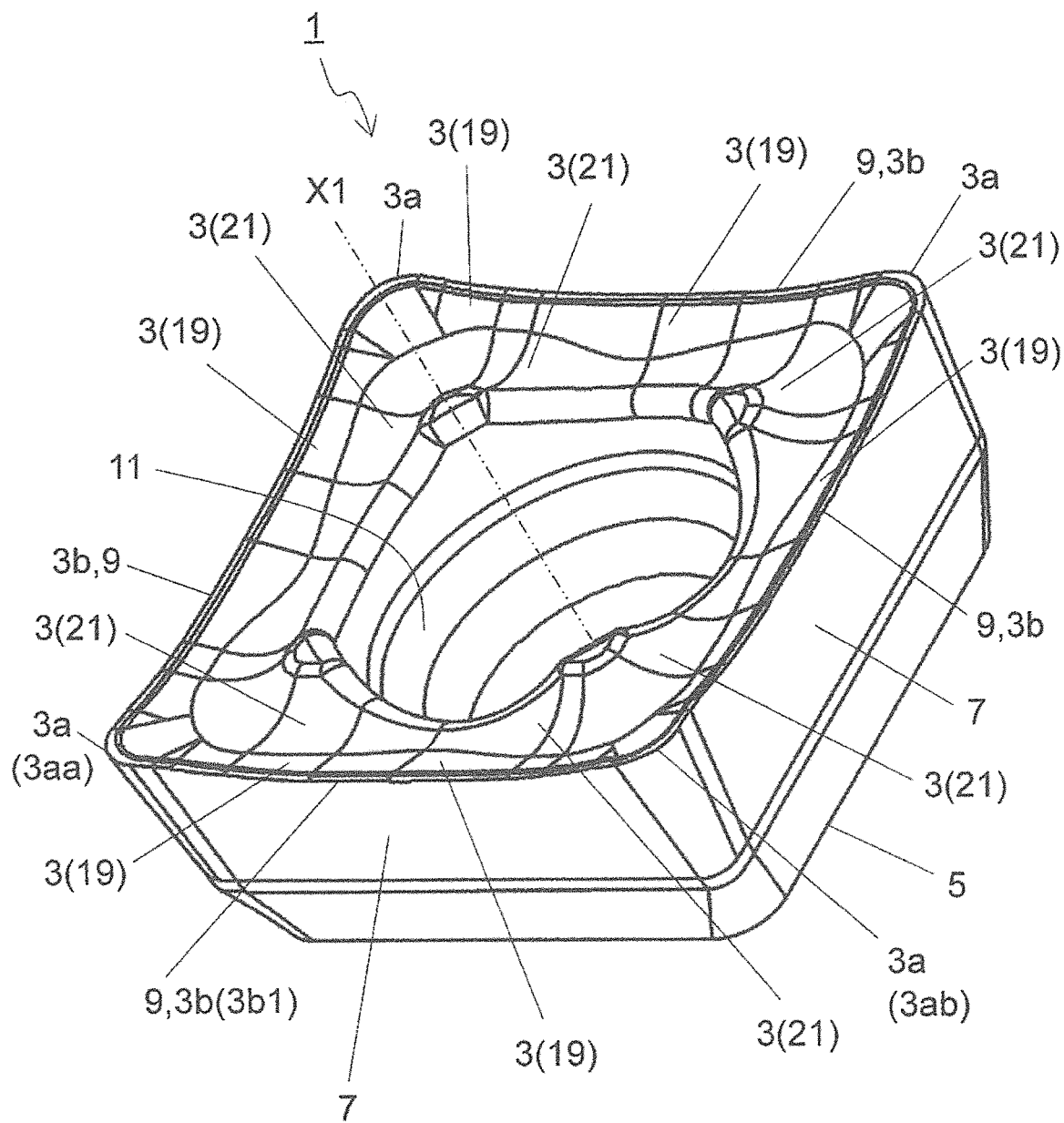
FIG. 1 is a perspective view illustrating a cutting insert in an embodiment of the present disclosure.

A cutting insert (hereinafter also referred to as "insert") in an embodiment of the present disclosure and a cutting tool including the cutting insert are described in detail below with reference to the drawings. Specifically, a cutting edge replaceable drill is described as a cutting tool. Examples of the cutting tool include end mills besides the cutting edge replaceable drill. An outer cutting edge insert in the drill is described as an insert.

For the sake of description, the drawings referred to in the following illustrate, in a simplified form, only main members necessary for describing embodiments. The cutting insert and the cutting tool in the present disclosure are therefore capable of including any arbitrary structural member not illustrated in the drawings referred to. Sizes of the members in each of the drawings do not faithfully represent actual structural members and size ratios of these members. These points are also true for a method of manufacturing a machined product described later.

<Cutting Insert>

Firstly, the insert 1 of the present embodiment is described with reference to the drawings. The insert 1 of the present embodiment is suitably usable as the outer cutting edge insert in the cutting edge replaceable drill. The insert 1 includes, for example, an upper surface 3, a lower surface 5, a side surface 7, a cutting edge 9, and a through hole 11 as illustrated in FIG. 1.

For the sake of convenience, a surface located on an upper side in a perspective view illustrated in FIG. 1 is referred to as the upper surface 3. The upper surface 3 is not always located on the upper side in a state of being attached to the cutting tool, or during a cutting process. For the sake of convenience, a surface located on a lower side in the perspective view illustrated in FIG. 1 is referred to as the lower surface 5. The lower surface 5 is not always located on the lower side in the state of being attached to the cutting tool, or during the cutting process.

For example, cemented carbide or cermet is usable as a material of the insert 1. Examples of compositions of the cemented carbide include WC—Co, WC—TiC—Co, and WC—TiC—TaC—Co. The WC—Co is produced by adding cobalt (Co) powder to tungsten carbide (WC), followed by sintering. The WC—TiC—Co is produced by adding titanium carbide (TiC) to WC—Co. The WC—TiC—TaC—Co is produced by adding tantalum carbide (TaC) to WC—TiC—Co.

The cermet is a sintered composite material obtainable by compositing metal into a ceramic ingredient. A specific example of the cermet is one which is composed mainly of a titanium compound, such as titanium carbide (TiC) or titanium nitride (TiN).

A surface of the insert 1 may be coated with a coating film by using chemical vapor deposition (CVD) method or physical vapor deposition (PVD) method. As a composition of the coating film, there are, for example, titanium carbide (TiC), titanium nitride (TiN), titanium carbonitride (TiCN), and alumina ($Al_2O_3$).

The upper surface 3 has a polygonal shape and includes corner parts 3a and sides 3b. The upper surface 3 in the present embodiment has an approximately quadrangular shape. The term "polygonal shape" does not mean a strict polygonal shape. For example, each of four corner parts 3a on the upper surface 3 in the present embodiment is not made into a strict corner, but has a rounded shape in a top view. Each of four sides 3b is not made into a strict line shape. The term "top view" denotes a state in which the insert 1 is viewed toward the upper surface 3.

The lower surface 5 is a surface located on a side opposite to the upper surface 3, and functions as a seating surface when attaching the insert 1 to a holder. Similarly to the upper surface 3, the lower surface 5 in the present embodiment has a polygonal shape and is made into a flat surface shape being somewhat smaller than the upper surface 3. Therefore, an outer peripheral edge of the lower surface 5 is not visible due to the upper surface 3 in a top view shown in FIG. 2.

The shapes of the upper surface 3 and the lower surface 5 are not limited to the above embodiment. Although the upper surface 3 and the lower surface 5 have the approximately quadrangular shape in the insert 1 of the present embodiment, for example, the shapes of the upper surface 3 and the lower surface 5 in the top view may be a triangular shape, a pentagonal shape, a hexagonal shape, or an octagonal shape. Although the upper surface 3 in the present embodiment has an approximately square shape, the quadrangular shape is not limited to this shape, but may be a rhombus shape or rectangular shape.

The insert 1 of the present embodiment includes a through hole 11 that opens into the upper surface 3 and the lower surface 5. The through hole 11 is provided for inserting a screw therein when screwing the insert 1 into the holder of the drill. The lower surface 5 in the present embodiment is a flat surface, and an extending direction, in other words, a penetrating direction of a central axis X1 of the through hole 11 is orthogonal to the lower surface 5. The central axis X1 of the through hole 11 coincides with a central axis of the insert 1 in the present embodiment. Therefore, the central axis X1 of the through hole 11 may be replaced with the central axis of the insert 1. The central axis X1 of the insert 1 is an axis which extends between the upper surface 3 and the lower surface 5, and which serves as a rotation axis when the insert 1 is rotated in a top view.

Figure 2:
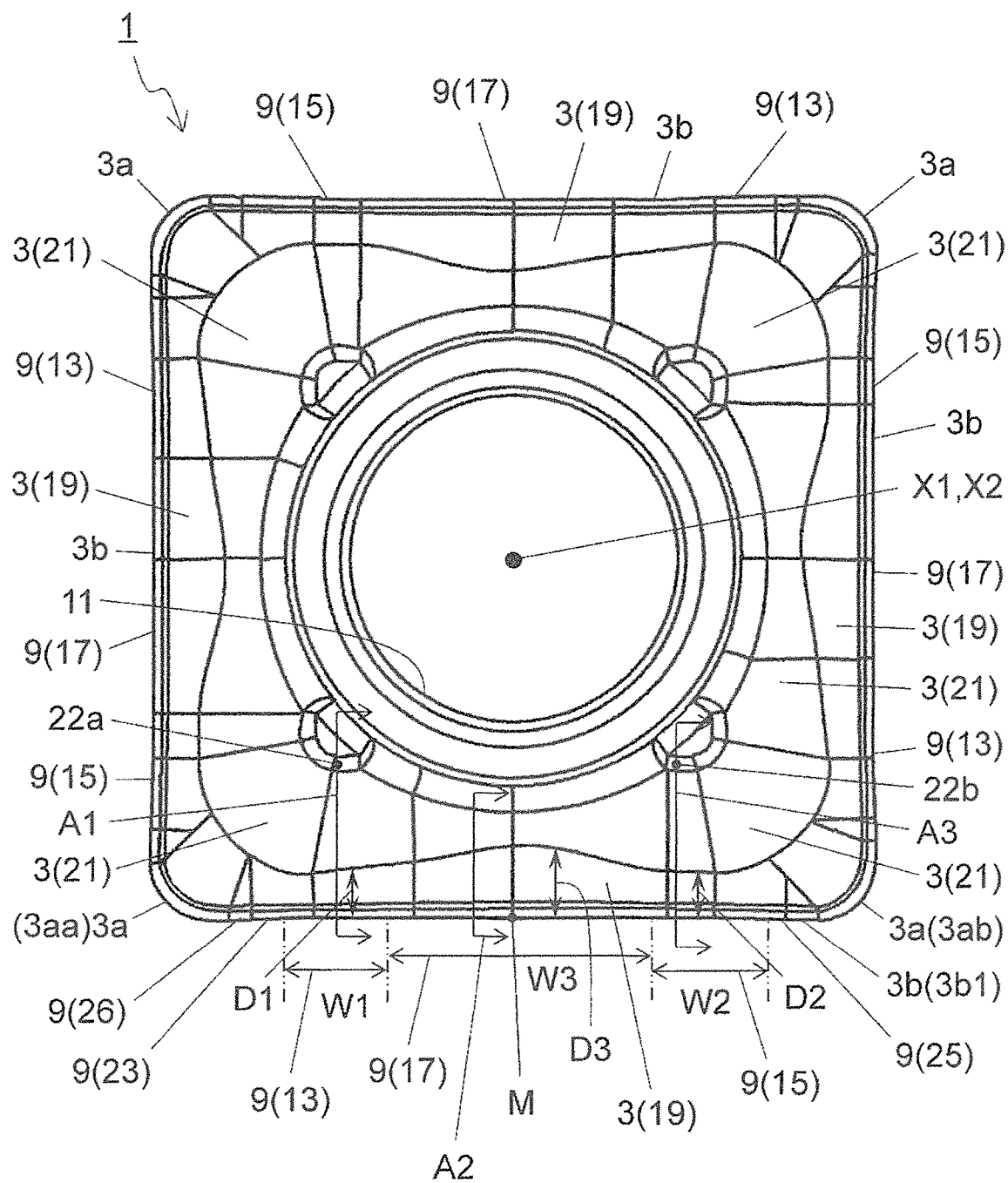
FIG. 2 is a top view of the cutting insert illustrated in FIG. 1.

In FIG. 2, the four corner parts 3a and the four sides 3b are located so as to have 90-degree rotational symmetry around the central axis X1 on the upper surface 3 in the present embodiment. Although not particularly illustrated, the lower surface 5 in the present embodiment has 90-degree rotational symmetry around the central axis X1 in a lower surface view. The term "lower surface view" denotes a state in which the insert 1 is viewed toward the lower surface 5.

The side surface 7 is located between the upper surface 3 and the lower surface 5, and connects to the upper surface 3 and the lower surface 5. Because the lower surface 5 has the shape somewhat smaller than the upper surface 3 as described above, the side surface 7 is inclined so as to approach the central axis X1 as going from a side of the upper surface 3 toward a side of the lower surface 5 (refer to FIG. 3).

When the upper surface 3 in the insert 1 of the present embodiment is viewed from above, a maximum width thereof is, for example, 6-25 mm. A height from the lower surface 5 to the upper surface 3 is, for example, 1-10 mm. The height from the lower surface 5 to the upper surface 3 denotes a length in a direction parallel to the central axis X in between an upper end (highermost portion) of the upper surface 3 and the lower surface 5 in a side view. The term "side view" in the present embodiment denotes a state in which the insert 1 is viewed from a direction parallel to the flat lower surface 5. However, in cases where the lower surface 5 does not have the flat surface shape, the side view may include viewing the insert 1 from a direction orthogonal to the central axis X1 of the through hole 11.

The configurations of the upper surface 3, the lower surface 5, and the side surface 7 are not limited to the above configurations. For example, the lower surface 5 may have the same shape as the upper surface 3, and an outer peripheral edge of the lower surface 5 may be overlapped with an outer peripheral edge of the upper surface 3 in a planar perspective. In this case, the side surface 7 is disposed so as to be orthogonal to the lower surface 5.

Figure 3:
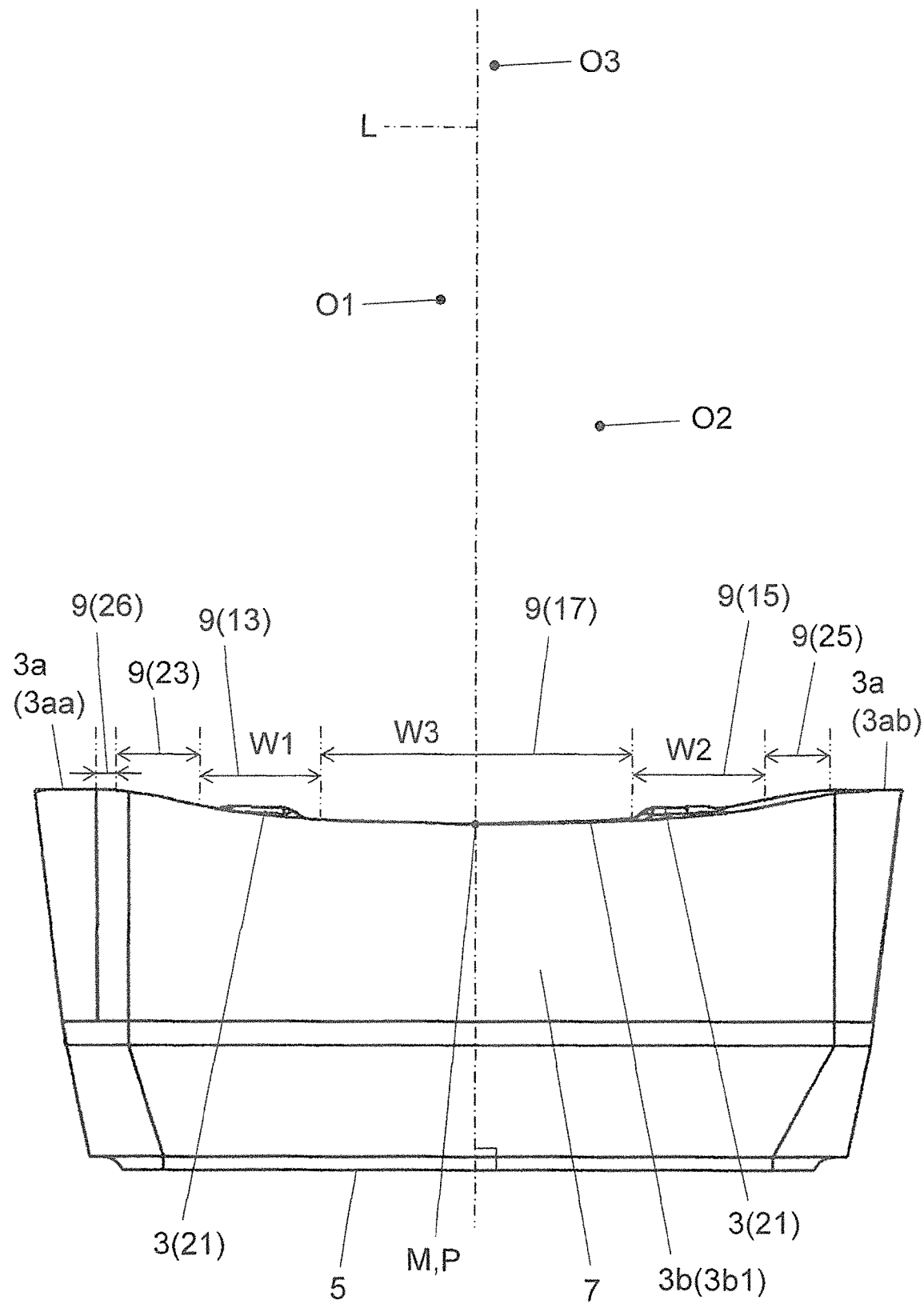
FIG. 3 is a side view of the cutting insert illustrated in FIG. 1.

The cutting edge 9 is located between the corner parts 3a located adjacent to each other on the upper surface 3, and in at least a part of a region in which the upper surface 3 intersects with the side surface 7. The cutting edge 9 is used for cutting out a workpiece during a cutting process. As illustrated in FIGS. 2 and 3, the cutting edge 9 in the present embodiment corresponds to a portion of the region in which the upper surface 3 intersects with the side surface 7, which is located in at least the side 3b1 on the upper surface 3. The portion being located as the cutting edge 9 in at least the side 3b1 on the upper surface 3 is described below.

The cutting edge 9 located at the side 3b1 on the upper surface 3 includes a first cutting edge 13, a second cutting edge 15, and a third cutting edge 17. In between a first corner part 3aa and a second corner part 3ab adjacent to each other on the upper surface 3, the first cutting edge 13 is located at a side of the first corner part 3aa, and the second cutting edge 15 is located at a side of the second corner part 3ab. The third cutting edge 17 is located between the first cutting edge 13 and the second cutting edge 15. The term "adjacent to each other" denotes a state in which the first corner part 3aa and the second corner part 3ab are located with the side 3b1 interposed therebetween, instead of a state in which the first corner part 3aa is strictly adjacent to the second corner part 3ab.

When the insert 1 is used as the outer cutting edge insert in the drill as in the present embodiment, the insert 1 is attached to the holder so that the first cutting edge 13 is closer to the rotation axis of the drill than the second cutting edge 15 and the third cutting edge 17. Here, the insert 1 is attached to the holder so that the second cutting edge 15 is further away from the rotation axis of the drill than the first cutting edge 13 and the third cutting edge 17.

As illustrated in FIG. 3, the cutting edge 9 located at the side 3b1 on the upper surface 3 has a curvilinear shape that is recessed toward the lower surface 5 as going from each of the first corner part 3aa and the second corner part 3ab toward a midportion M of the cutting edge 9 in a side view. Accordingly, each of the first cutting edge 13, the second cutting edge 15, and the third cutting edge 17 has a concave curvilinear shape. As the curvilinear shape being recessed toward the lower surface 5, namely, the concave curvilinear shape, there is, for example, a circular arc shape. The cutting edge 9 need not be strictly the curvilinear shape being recessed from each of the first corner part 3aa and the second corner part 3ab toward the midportion M in the side view. Specifically, even though a lowermost position of the cutting edge 9 corresponds to the midportion M of the cutting edge 9 in the present embodiment, the cutting edge 9 need to have the concave curvilinear shape in the side view, and the lowermost position of the cutting edge 9 need not be strictly the midportion M of the cutting edge 9.

Thus, because the cutting edge 9 has the curvilinear shape being recessed toward the lower surface 5, the shape of chips generated during the cutting process using the insert 1 of the present embodiment becomes a shape being curved correspondingly to the shape of the cutting edge 9. Because the chips flow in a direction approximately orthogonal to the cutting edge 9, the chips have a shape being curved correspondingly to the shape of the cutting edge 9 in a direction orthogonal to a chip flow direction.

The chips generated by the cutting edge 9 flow not over the side surface 7 but over the upper surface 3. Here, the chips also curve in a direction along the chip flow direction due to contact with the upper surface 3. The chips being curved in the direction along the chip flow direction bend due to contact with the holder or the like. Consequently, the chips are made into a shape in which the chips having a convex curvilinear shape are continuous with each other along the chip flow direction. The chips tend to be divided at a bent portion as described above.

In the insert 1 of the present embodiment, the third cutting edge 17 is located between the first cutting edge 13 and the second cutting edge 15, and each of a radius of curvature of the first cutting edge 13 and that of the second cutting edge 15 is smaller than a radius of curvature of the third cutting edge 17 in a side view. Specifically, R1<R3 and R2<R3 when R1 is the radius of curvature of the first cutting edge 13, R2 is the radius of curvature of the second cutting edge 15, and R3 is the radius of curvature of the third cutting edge 17 in the side view.

Because each of the radius of curvature R1 of the first cutting edge 13 and the radius of curvature R2 of the second cutting edge 15 is smaller than the radius of curvature R3 of the third cutting edge 17, chips generated by the first cutting edge 13 and chips generated by the second cutting edge 15 curve greater than chips generated by the third cutting edge 17. Therefore, the chips curve greatly at opposite end portions along a direction orthogonal to an extending direction of the chips. Then, deformation of the opposite end portions becomes large when the chips bend due to the contact with the holder or the like. The chips are consequently susceptible to cracking from the opposite end portions.

Because the chips are susceptible to the cracking from the opposite end portions along the direction orthogonal to the extending direction of the chips, the chips are less likely to extend excessively, and the chips tend to be divided in an appropriate length. The chips are therefore less likely to be caught by the holder, and chip clogging is less likely to occur, thereby ensuring that the chips can be discharged well.

Moreover, the radius of curvature R3 of the third cutting edge 17 has a larger value than each of the radius of curvature R1 of the first cutting edge 13 and the radius of curvature R2 of the second cutting edge 15. This makes it easier to ensure that the insert 1 has a large thickness between the third cutting edge 17 and the lower surface 5. It is therefore also possible to enhance durability of the insert 1. Thus, it is possible to enhance both chip discharge performance and the durability of the insert 1.

Alternatively, the radius of curvature R1 of the first cutting edge 13 may be greater than the radius of curvature R2 of the second cutting edge 15 in the side view in the insert 1 of the present embodiment. Specifically, a relationship of R2<R1 may be established. As described earlier, when the insert 1 is used as the outer cutting edge insert in the drill as in the present embodiment, the insert 1 is attached to the holder so that the second cutting edge 15 is further away from the rotation axis of the drill than the first cutting edge 13 and the third cutting edge 17.

Therefore, the chips generated by the second cutting edge 15 tend to become longer than the chips generated by each of the first cutting edge 13 and the third cutting edge 17. When the relationship of R2<R1 is established, the chips generated by the second cutting edge 15 tend to curve greatly, and the chips are therefore susceptible to cracking from this portion. Consequently, the chips are more likely to be divided in the appropriate length.

A part of the cutting edge 9 which is made up of the first cutting edge 13, the second cutting edge 15, and the third cutting edge 17 has a curvilinear shape being recessed toward a center X2 of the upper surface 3 as going from each of the first corner part 3aa and the second corner part 3ab toward the midportion M of the cutting edge 9 in a top view as illustrated in FIG. 2. The center X2 of the upper surface 3 coincides with the central axis X1 in the present embodiment. Examples of the curvilinear shape include a circular arc shape. The cutting edge 9 need not to have the curvilinear shape that is strictly recessed as going from each of the first corner part 3aa and the second corner part 3ab toward the midportion M in the top view. Specifically, even though a point located innermost in the cutting edge 9 corresponds to the midportion M, the cutting edge 9 need to have the concave curvilinear shape in a top view, and the point located innermost in the cutting edge 9 need not to be strictly the midportion M of the cutting edge 9.

A radius of curvature R4 of the first cutting edge 13 in a top view, a radius of curvature R5 of the second cutting edge 15 in a top view, and a radius of curvature R6 of the third cutting edge 17 in a top view may satisfy the following relationship. That is, the radius of curvature R4 of the first cutting edge 13 in the top view may be greater than the radius of curvature R1 of the first cutting edge 13 in the side view. The radius of curvature R5 of the second cutting edge 15 in the top view may be greater than the radius of curvature R2 of the second cutting edge 15 in the side view. The radius of curvature R6 of the third cutting edge 17 in the top view may be greater than the radius of curvature R3 of the third cutting edge 17 in the side view.

As described earlier, the chips generated by the cutting edge 9 curve correspondingly to the shape of the cutting edge 9 in the side view. Because the chips are generated by shear deformation of a workpiece, a shear plane appears correspondingly to the shape of the cutting edge 9 in a top view. Accordingly, when the radii of curvature R4, R5, and R6 of the first cutting edge 13, the second cutting edge 15, and the third cutting edge 17 in the top view are respectively greater than the radii of curvature R1, R2, and R3 of the first cutting edge 13, the second cutting edge 15, and the third cutting edge 17 in the side view (R4>R1, R5>R2, and R6>R3), a curvature of the shear plane can be reduced to facilitate stable progress of cracking. Consequently, the chips are more likely to be divided, and the chips are therefore less likely to extend excessively. Alternatively, each of the radius of curvature R4 of the first cutting edge 13 and the radius of curvature R5 of the second cutting edge 15 in the top view may be configured to be smaller than the radius of curvature R6 of the third cutting edge 17 in the top view. That is, a relationship of R4<R6 and R5<R6 may be established.

The radii of curvature R1, R2, and R3 in the side view and the radii of curvature R4, R5, and R6 in the top view are settable to the following values. R1 is, for example, 3-20 mm. R2 is, for example, 2-15 mm. R3 is, for example, 15-60 mm. R4 is, for example, 50-150 mm. R5 is, for example, 50-150 mm. R6 is, for example, 150-400 mm.

The upper surface 3 in the present embodiment may include a first inclined surface 19 and a second inclined surface 21. Here, the first inclined surface 19 is an inclined surface of downward inclination which is located more inside than the cutting edge 9 and goes downward so as to approach the lower surface 5 as going away from the cutting edge 9 (refer to FIGS. 4 to 6). The second inclined surface 21 is an inclined surface of upward inclination which is located more inside than the first inclined surface 19 and goes upward so as to depart from the lower surface 5 as going away from the first inclined surface 19. The term "inside" denotes a side of the through hole 11 (a side of the central axis X1).

As described earlier, the chips generated by the cutting edge 9 flow over the upper surface 3. The first inclined surface 19 can be functioned as a rake surface over which the chips flow. The second inclined surface 21 can be functioned as a breaker wall surface that causes the chips to curl. Here, at least a part of the side surface 7 functions as a so-called flank surface.

As illustrated in FIG. 2, a distance D3 between the third cutting edge 17 and the second inclined surface 21 may be greater than each of a distance D1 between the first cutting edge 13 and the second inclined surface 21 and a distance D2 between the second cutting edge 15 and the second inclined surface 21 in a top view in the insert 1 of the present embodiment. When this relationship is satisfied, portions of the chips flowing from the cutting edge 9 to the second inclined surface 21, which are generated by each of the first cutting edge 13 and the second cutting edge 15, come into contact with the second inclined surface 21 at a relatively early stage. Portions of the above chips, which are generated by the third cutting edge 17 located between the first cutting edge 13 and the second cutting edge 15, come into contact with the second inclined surface 21 at a relatively late stage.

This makes it possible to stabilize the chip flow direction on the second inclined surface 21. Additionally, the chips that curve correspondingly to the shape of the cutting edge 9 in the side view can be curved more greatly on the second inclined surface 21. In other words, the chips can be narrowed down in the direction orthogonal to the chip flow direction on the second inclined surface 21. This further facilitates occurrence of cracking in the chips. The distances D1, D2, and D3 are settable to the following values. D1 is, for example, 0.3-1 mm. D2 is, for example, 0.2-2 mm. D3 is, for example, 0.3-1 mm.

Figure 6:
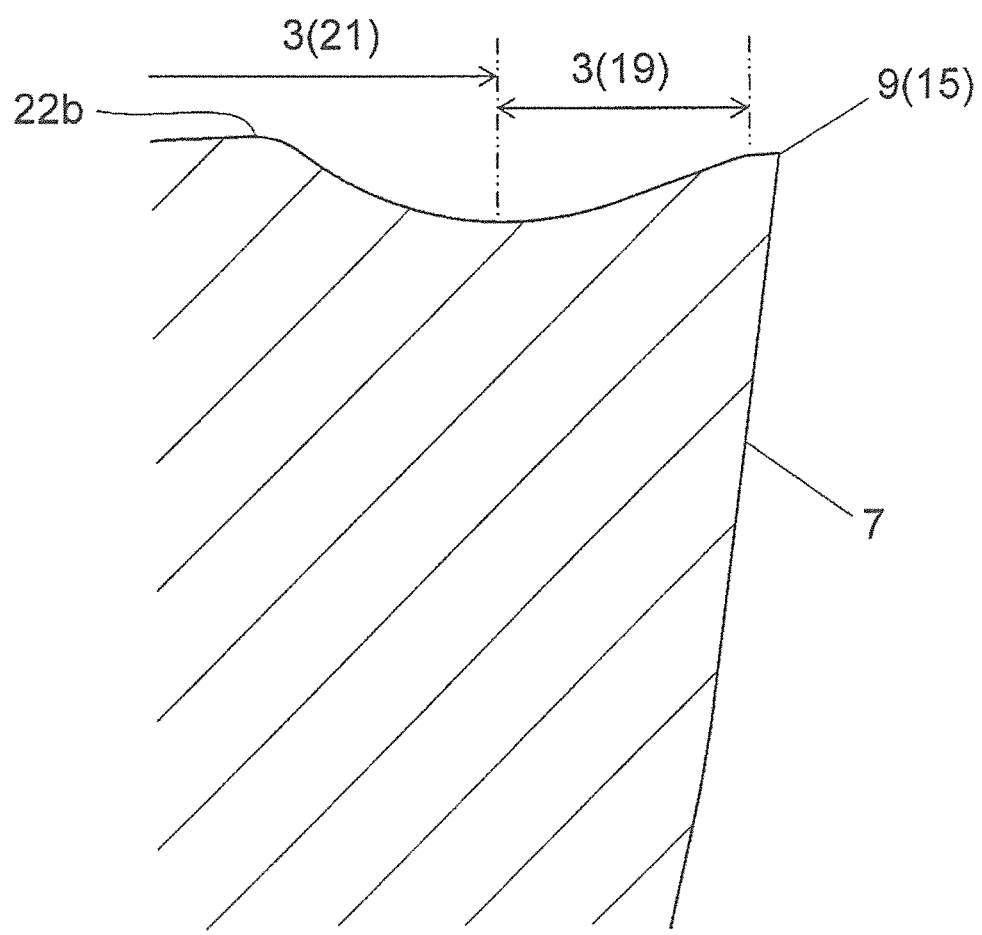
FIG. 6 is a sectional view taken along line A3 in FIG. 2.
Figure 7:
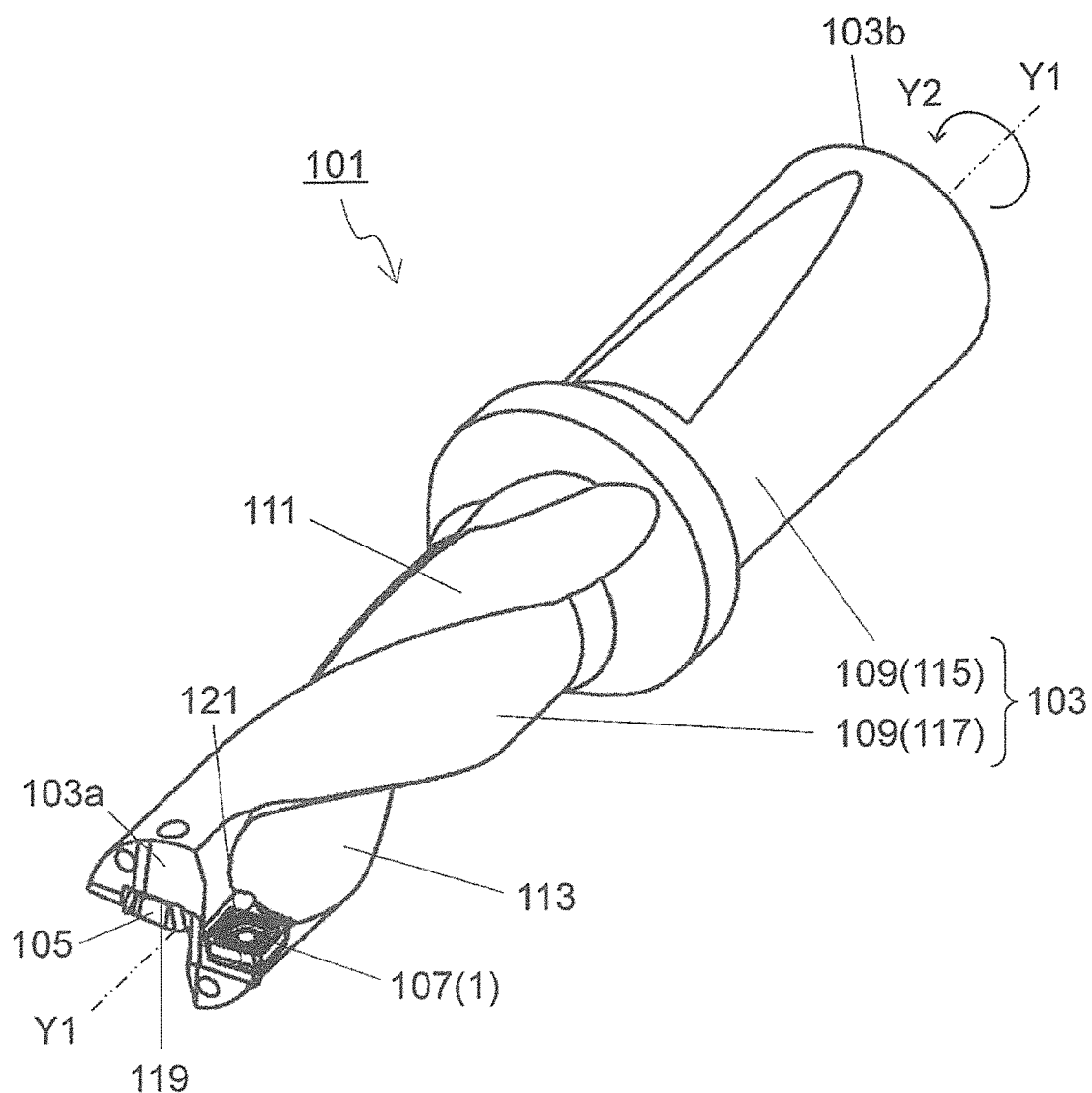
FIG. 7 is a perspective view illustrating a cutting tool (drill) in an embodiment of the present disclosure.

As illustrated in FIGS. 2 and 6, the second inclined surface 21 may include a second top portion 22b located at a side of the second corner part 3ab. When the second inclined surface 21 has the above configuration, the chip flow direction can be further stabilized on the second inclined surface 21, and it is easier to cause the chips to curve more greatly on the second inclined surface 21. Alternatively, the second top portion 22b may be located at a portion of the second inclined surface 21 which corresponds to an inner side of the second cutting edge 15.

Figure 4:
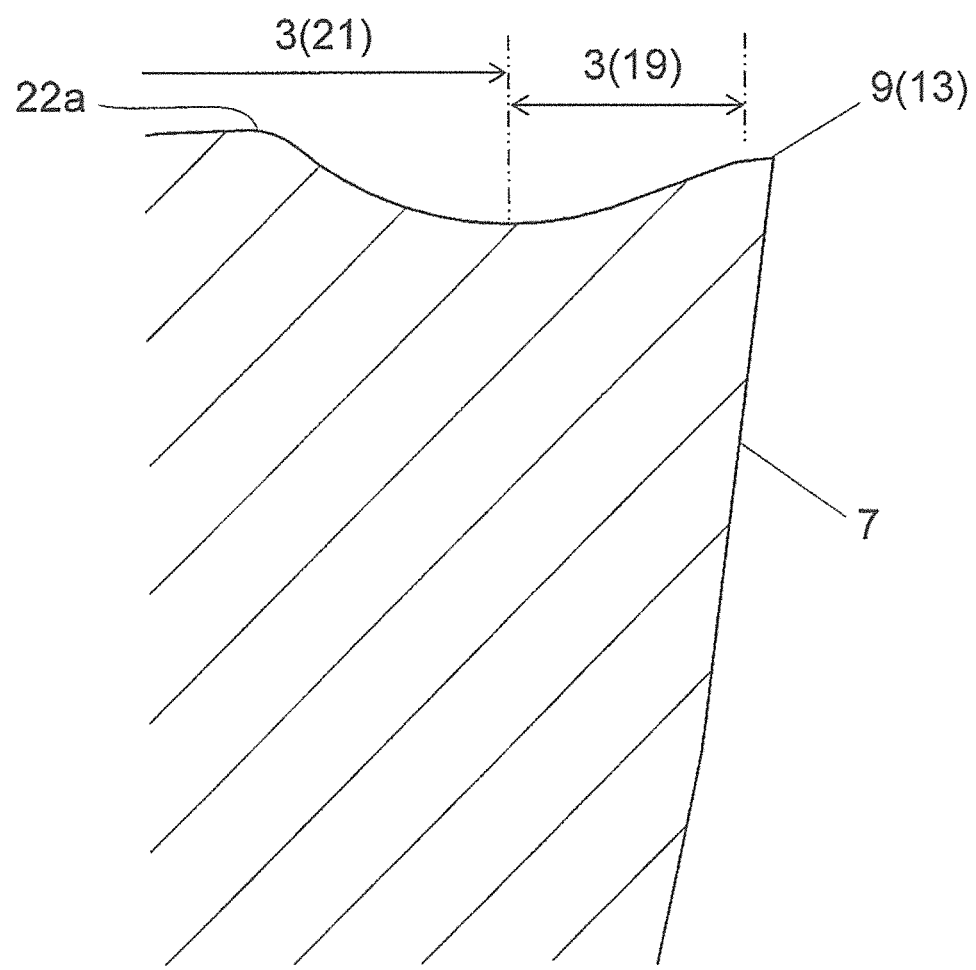
FIG. 4 is a sectional view taken along line A1 in FIG. 2.
Figure 5:
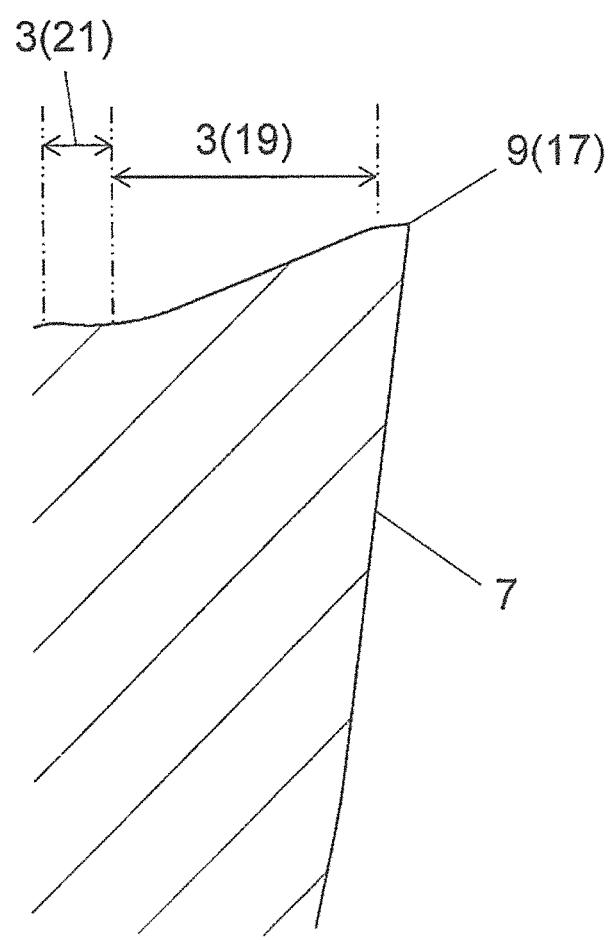
FIG. 5 is a sectional view taken along line A2 in FIG. 2.

As illustrated in FIGS. 2 and 4, the second inclined surface 21 may further include a first top portion 22a located at a side of the first corner part 3aa. A height of the first top portion 22a may be identical to a height of the second top portion 22b. With this configuration, together with the effect owing to the first top portion 22a, the chip flow direction can be further stabilized on the second inclined surface 21, and it becomes easier to cause the chips to curve more greatly on the second inclined surface 21. Alternatively, the first top portion 22a may be located at a portion of the second inclined surface 21 which corresponds to an inner side of the first cutting edge 13.

The term "height" denotes a distance from the flat lower surface 5. For example, when the lower surface 5 does not have the flat surface shape, a distance from an imaginary surface orthogonal to the central axis X1 of the through hole 11 may be evaluated as the height. The term "top portion" denotes a portion having a maximum height in the portion of the second inclined surface 21.

As illustrated in FIG. 3, a width W3 of the third cutting edge 17 may be greater than each of a width W1 of the first cutting edge 13 and a width W2 of the second cutting edge 15 in a side view in the present embodiment. The term "width" denotes a length in a direction parallel to the lower surface 5 or orthogonal to the central axis X1 of the through hole 11 in a side view. When the width W3 of the third cutting edge 17 is great, the width W1 of the first cutting edge 13 and the width W2 of the second cutting edge 15 can be made relatively narrow. Therefore, the height in a vertical direction of the cutting edge 9 is less likely to become excessively large. It is easy to ensure that the insert 1 has a large thickness from the cutting edge 9 to the lower surface 5. It is therefore easy to enhance the durability of the insert 1. The widths W1, W2, and W3 are settable to the following values. Each of W1 and W2 is, for example, 0.15S to 0.35S, and W3 is, for example, 0.35S to 0.65S when S is a length of the side 3b1.

As illustrated in FIG. 3, each of the first cutting edge 13, the second cutting edge 15, and the third cutting edge 17 may have a circular arc shape in a side view. Here, a center O3 of a circular arc of the third cutting edge 17 may be located closer to the second cutting edge 15 than the first cutting edge 13 in the side view. In other words, the center O3 of the circular arc of the third cutting edge 17 may be located closer to the second cutting edge 15 than a line L which passes through a midpoint P of the third cutting edge 17 and is vertical to the lower surface 5 in the side view. A width of chips generated when the insert 1 is used as the outer cutting edge insert is equivalent to a certain length of the length of the side 3b1 which covers from a vicinity of the second corner part 3ab to a vicinity of a boundary between the first cutting edge 13 and the third cutting edge 17. Specifically, the center of the width of the chips generated when the insert 1 is used as the outer cutting edge insert is located at a side of the second corner part 3ab with respect to the line L. Thus, because the center O3 of the circular arc of the third cutting edge 17 is located at the position as described above, a midportion of the chips being curved in a direction along the cutting edge 9 has a large thickness. It is therefore possible to more stably control the chips. Consequently, the chip clogging is still less likely to occur, thus leading to improved chip discharge performance.

Each of the first cutting edge 13, the second cutting edge 15, and the third cutting edge 17 may have a circular arc shape in a side view. Here, a center O2 of a circular arc of the second cutting edge 15 may be located further away from the center O3 of a circular arc of the third cutting edge than the center O1 of the first cutting edge 13 in the side view. In other words, the center O2 of the circular arc of the second cutting edge 15 may be located further away from the line L than the center O1 of the circular arc of the first cutting edge 13 in the side view. These configurations enhance the effect of curving the chips generated by the second cutting edge 15 rather than the chips generated by the first cutting edge 13, thereby further facilitating division of the chips.

In the insert 1 of the present embodiment, the cutting edge 9 located at the side 3b1 on the upper surface 3 may further include a fourth cutting edge 23 and a fifth cutting edge 25 in addition to the first cutting edge 13, the second cutting edge 15, and the third cutting edge 17. Here, the fourth cutting edge 23 is located between the first corner part 3aa and the first cutting edge 13 on the upper surface 3, and may have a curvilinear shape being protruded upward in a side view. The fifth cutting edge 25 is located between the second corner part 3ab and the second cutting edge 15 on the upper surface 3, and may have a curvilinear shape being protruded upward in a side view. The fourth cutting edge 23 and the fifth cutting edge 25 may have a circular arc shape in the side view.

For example, when the cutting edge 9 is also located at the corner part 3a of the upper surface 3 and the corner part 3a is used for a cutting process, the fourth cutting edge 23 and the fifth cutting edge 25 contribute to creating a smooth connection between each of the first cutting edge 13 and the second cutting edge 15 and the corner part 3a of the upper surface 3. This leads to enhanced durability of the cutting edge 9.

Although the fourth cutting edge 23 and the fifth cutting edge 25 are usable for a cutting process as a part of the cutting edge 9 in the present embodiment, there is no intention of limiting thereto. For example, when members respectively corresponding to the fourth cutting edge 23 and the fifth cutting edge 25 are not used as the cutting edge 9, the members respectively corresponding to the fourth cutting edge 23 and the fifth cutting edge 25 may be formed merely by a ridgeline over which the upper surface 3 intersects with the side surface 7.

In the insert 1 of the present embodiment, the cutting edge 9 may further include a sixth cutting edge 26 located between the first corner part 3aa and the fourth cutting edge 23. Here, the sixth cutting edge 26 may have a straight line shape parallel to the lower surface 5 in a side view, and have a curvilinear shape being protruded outward in a top view. These configurations make it possible for the sixth cutting edge 26 to suitably function as a flat cutting edge when the cutting edges 9 each having the same configuration are respectively disposed on the plurality of sides 3b as in the present embodiment. Specifically, for example, when the cutting edge 9 on the side 3b1 located between the first corner part 3aa and the second corner part 3ab is used as a major cutting edge, the sixth cutting edge 26 of the cutting edge 9 located at another side 3b located adjacent to the side 3b1 suitably functions as the flat cutting edge. This leads to improved machined surface accuracy.

A region in which the upper surface 3 intersects with the side surface 7 and the cutting edge 9 is formed may be subjected to a so-called honing process. Specifically, the ridgeline over which the upper surface 3 intersects with the side surface 7 need not be a strict line shape obtainable from the intersection of these two surfaces. The strength of the cutting edge 9 is less likely to deteriorate when the region in which the upper surface 3 intersects with the side surface 7 is already subjected to the honing process. Examples of the honing process include a round honing process by which the region described above is made into a curvilinear shape.

Although the cutting edge 9 in the present embodiment includes the first cutting edge 13, the second cutting edge 15, the third cutting edge 17, the fourth cutting edge 23, the fifth cutting edge 25, and the sixth cutting edge 26 as described above, the cutting edge 9 is not limited to one which is made up of only these members. Specifically, a connection portion (not illustrated) to create a smooth connection between these members may be disposed therebetween. For example, a straight line shaped cutting edge portion may be interposed between the first cutting edge 13 and the third cutting edge 17 in order to connect these cutting edges 9 to each other. For example, when the cutting edge 9 is made up of the first cutting edge 13, the second cutting edge 15, and the third cutting edge 17 without including the fourth cutting edge 23, the fifth cutting edge 25, and the sixth cutting edge 26, the first cutting edge 13 may connect to the first corner part 3aa, and the second cutting edge 15 may connect to the second corner part 3ab.

<Cutting Tool (Drill)>

A drill 101 in an embodiment is described below with reference to the drawings.

As illustrated in FIGS. 7 to 11, the drill 101 of the present embodiment includes a bar-shaped holder 103 extending along a rotation axis Y1, and an inner cutting edge insert 105 and an outer cutting edge insert 107 which are attached to a front end 103a of the holder 103. The drill 101 is usable, for example, for a drilling process. The insert 1 of the foregoing embodiment is used as the outer cutting edge insert 107 in the present embodiment. An insert (first insert) that is different from the insert 1 of the foregoing embodiment is used as the inner cutting edge insert 105 in the present embodiment. Alternatively, the insert 1 of the foregoing embodiment may be used as the inner cutting edge insert 105, in addition to the outer cutting edge insert 107.

The holder 103 includes a main body 109, a first chip discharge flute 111 (hereinafter also referred to simply as "a first flute 111"), and a second chip discharge flute 113 (hereinafter also referred to simply as "a second flute 113"). The main body 109 has a bar shape extending along the rotation axis Y1. The main body 109 rotates around the rotation axis Y1 during a cutting process.

The main body 109 in the present embodiment includes a holding member 115 which is held by, for example, a rotating spindle of a machine tool (not illustrated), and is called "shank", and a cutting member 117 which is located closer to a front end side than the holding member 115, and is called "body." The holding member 115 is a member to be designed according to the shape of the spindle and the like in the machine tool. The cutting member 117 is a member in which the inserts 105 and 107 are attached to a front end of the cutting member 117. The cutting member 117 plays a major role in the cutting process of a workpiece. Arrow Y2 indicates a rotation direction of the main body 109.

Figure 9:
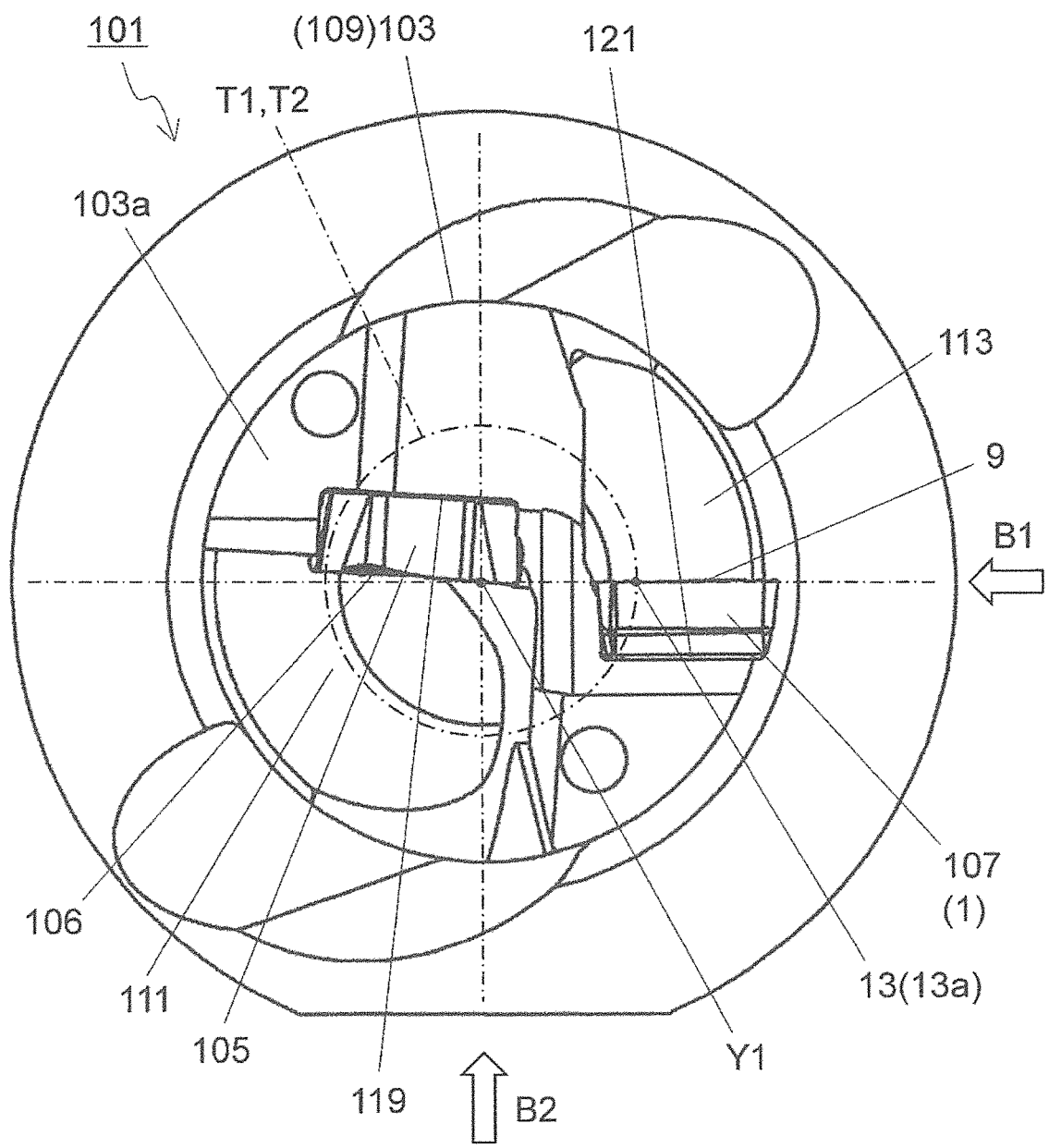
FIG. 9 is a front end view when the cutting tool illustrated in FIG. 7 is viewed from a front end side thereof.

The front end of the cutting member 117 in the main body 109 is provided with an inner cutting edge pocket 119 and an outer cutting edge pocket 121. The inner cutting edge pocket 119 is a recessed portion disposed at an inner peripheral side in the front end of the cutting member 117, and is the portion to which the inner cutting edge insert 105 is attached. The outer cutting edge pocket 121 is a recessed portion disposed at an outer peripheral side in the front end of the cutting member 117, and is the portion to which the outer cutting edge insert 107 is attached. As illustrated in FIG. 9, the outer cutting edge pocket 121 is located further away from the rotation axis Y1 than the inner cutting edge pocket 119. The inner cutting edge pocket 119 and the outer cutting edge pocket 121 are disposed away from each other in order to avoid contact between the inner cutting edge insert 105 and the outer cutting edge insert 107. The term "inner peripheral side" denotes a side closer to the rotation axis Y1, and the term "outer peripheral side" denotes a side away from the rotation axis Y1.

Figure 8:
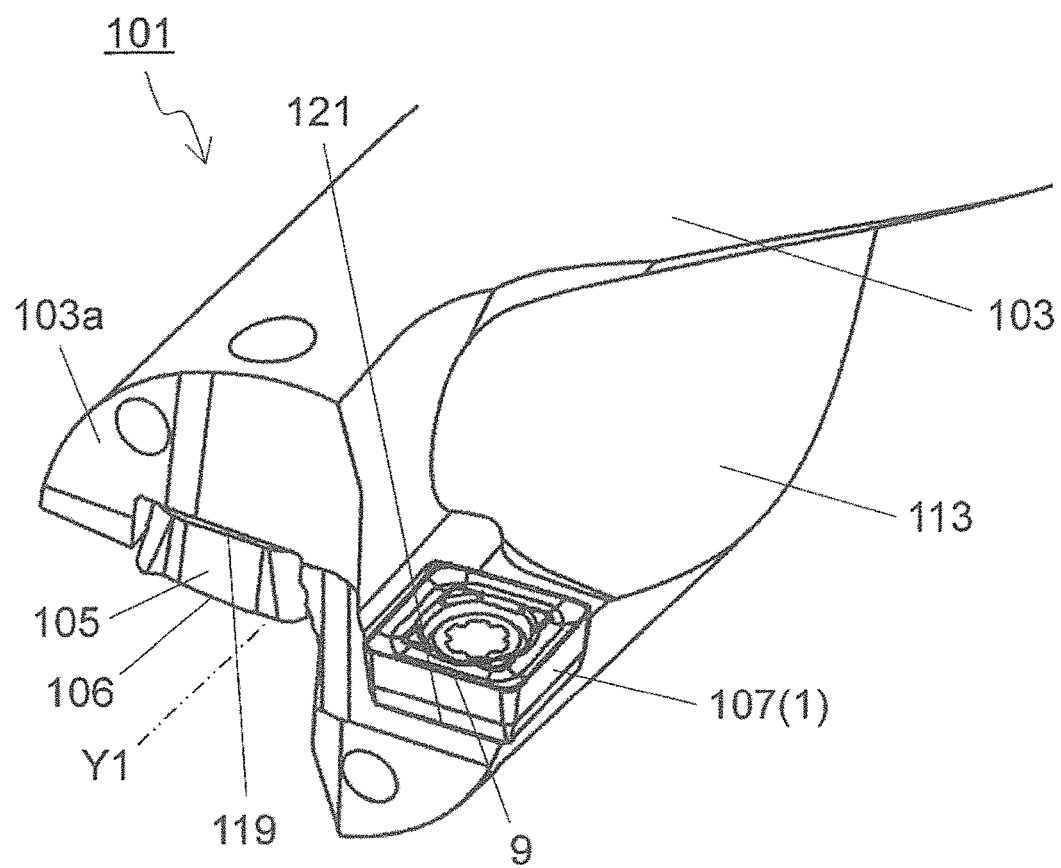
FIG. 8 is an enlarged view illustrating in enlarged dimension a front end portion of the cutting tool illustrated in FIG. 7.

The inner cutting edge insert 105 and the outer cutting edge insert 107 are detachably attached to the inner cutting edge pocket 119 and the outer cutting edge pocket 121, respectively. In other words, the inner cutting edge insert 105 (first insert) is attached to the inner peripheral side in the front end 103a of the holder 103, and the outer cutting edge insert 107 (insert 1) is attached to the outer peripheral side in the front end 103a of the holder 103. Here, as illustrated in FIGS. 8 and 9, the inner cutting edge insert 105 is attached so that the cutting edge 106 in the inner cutting edge insert 105 intersects with the rotation axis Y1.

As illustrated in FIG. 9, a rotation locus of the cutting edge 106 in the inner cutting edge insert 105 is partially overlapped with a rotation axis of the cutting edge 9 in the outer cutting edge insert 107 in a front end view. The rotation locus of the cutting edge 106 in the inner cutting edge insert 105 and the rotation locus of the cutting edge 9 in the outer cutting edge insert 107 are overlapped with the entirety of the cutting member 117 of the main body 109 in the front end view. A drilling process having an outer diameter of the cutting member 117 of the main body 109 is executable by the cutting edge 106 of the inner cutting edge insert 105 and the cutting edge 9 of the outer cutting edge insert 107 which are disposed as described above.

The rotation locus T1 of the cutting edge 106 of the inner cutting edge insert 105 (first insert) intersects with the rotation locus T2 at an outer peripheral side end 13a of the first cutting edge 13 of the outer cutting edge insert 107 (insert 1) in the present embodiment. With this configuration, even when the outer cutting edge insert 107 (insert 1) is attached to a different position from that of the inner cutting edge insert 105 in a radial direction of the holder 103, it is easy to retain well-balanced cutting resistance exerted on these two inserts. This makes it possible to use the insert 1 for the holder 103 having a plurality of different drilling diameters, thereby making the insert 1 more economical.

The term "front end view" denotes a state in which the drill 101 is viewed toward the front end 103a of the holder 103. The outer peripheral side end 13a of the first cutting edge 13 corresponds to one of opposite ends of the first cutting edge 13 which is located at a side of the third cutting edge 17.

Figure 10:
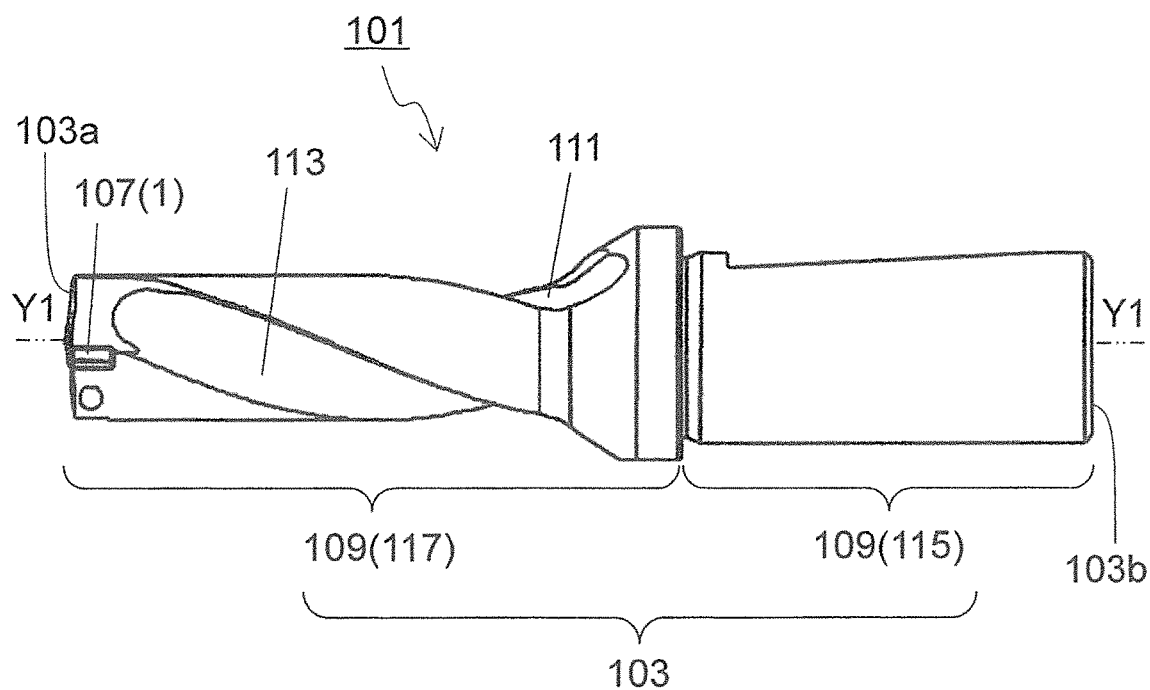
FIG. 10 is a side view when the cutting tool illustrated in FIG. 9 is viewed from B1 direction.
Figure 11:
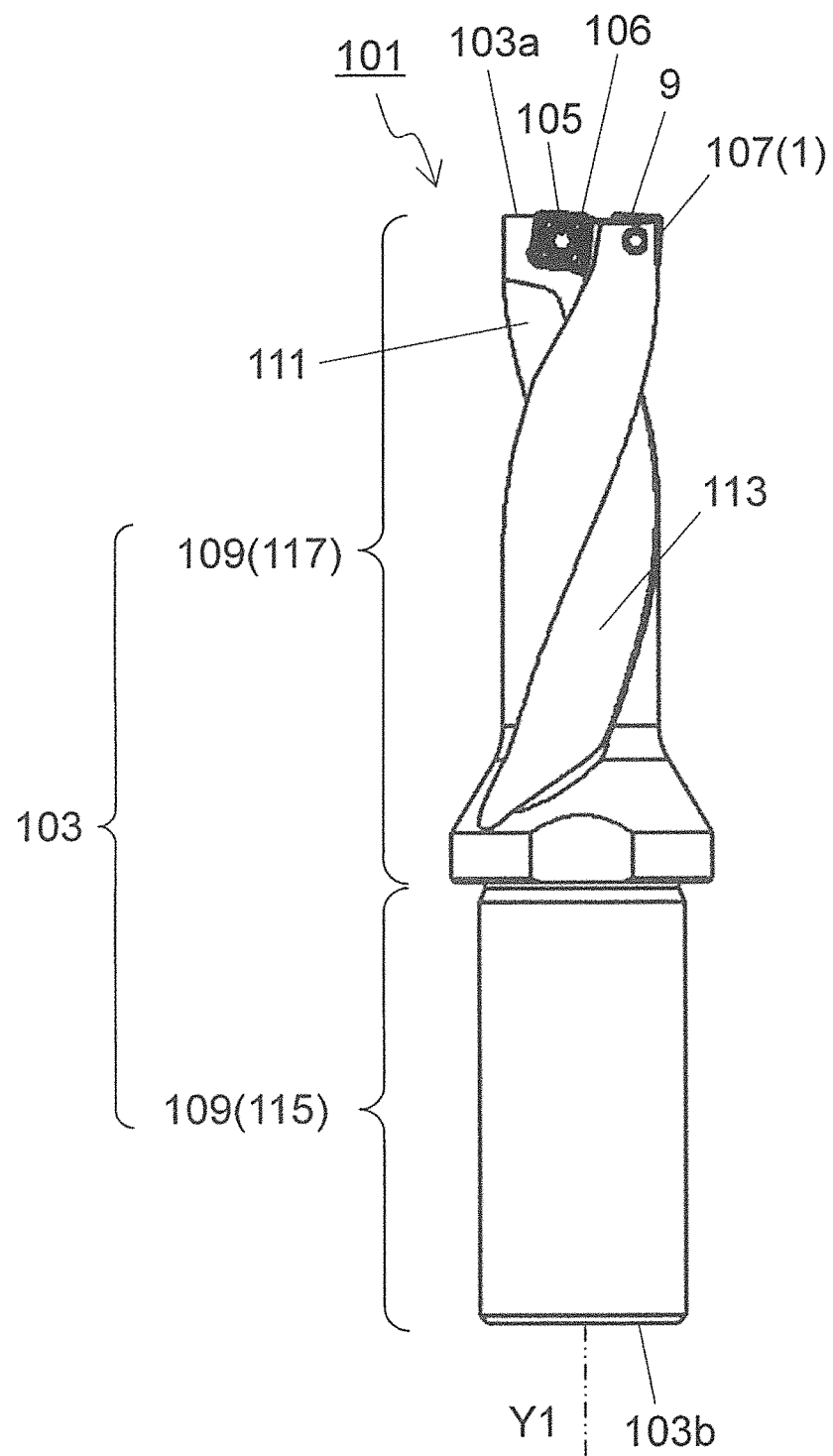
FIG. 11 is a side view when the cutting tool illustrated in FIG. 9 is viewed from B2 direction.

As illustrated in FIG. 11, the first flute 111 extends spirally around the rotation axis Y1 in a direction from the inner cutting edge insert 105 toward a rear end 103b of the holder 103. As illustrated in FIG. 10, the second flute 113 extends spirally around the rotation axis Y1 in a direction from the outer cutting edge insert 107 toward the rear end 103b of the holder 103. In the present embodiment, the first flute 111 and the second flute 113 are disposed on the cutting member 117 in the main body 109, but are not disposed on the holding member 115.

In the drill 101 of the present embodiment, an outer diameter of the cutting member 117 is settable to, for example, 6-42.5 mm. The drill 101 of the present embodiment is settable to, for example, E=2F to E=12F, when E is a length of an axis (length of the cutting member 117), and F is a diameter (outer diameter of the cutting member 117).

As a material of the main body 109, for example, steel, cast iron, or aluminum alloy are usable. Of these materials, a high rigidity steel is used for the main body 109 in the present embodiment.

The first flute 111 is intended mainly to discharge chips generated by the cutting edge 106 of the inner cutting edge insert 105. During a cutting process, the chips generated by the inner cutting edge insert 105 are discharged through the first flute 111 to the rear end side of the main body 109. The second flute 113 is intended mainly to discharge chips generated by the cutting edge 9 of the outer cutting edge insert 107. During the cutting process, the chips generated by the outer cutting edge insert 107 are discharged through the second flute 113 to the rear end side of the main body 109.

A depth of each of the first flute 111 and the second flute 113 is settable to, for example, approximately to 10-40% of the outer diameter of the cutting member 117. Here, the depth of each of the first flute 111 and the second flute 113 denotes a value obtainable by subtracting a distance between a bottom of each of the first flute 111 and the second flute 113 and the rotation axis Y1, from a radius of the cutting member 117 in a cross section orthogonal to the rotation axis Y1. A diameter of a web thickness is settable to, for example, approximately 20-80% of the outer diameter of the cutting member 117. The diameter of the web thickness is equivalent to a diameter of a maximum circle (inscribed circle) that is formable in a cross section of the cutting member 117 orthogonal to the rotation axis Y1. Specifically, for example, when the outer diameter D of the cutting member 117 is 20 mm, the depth of each of the first flute 111 and the second flute 113 is settable to approximately 2-8 mm.

<Method of Manufacturing Machined Product>

A method of manufacturing a machined product in an embodiment of the present disclosure is described below with reference to FIGS. 12 to 14 by exemplifying the case of using the drill 101 in the foregoing embodiment. A rear end side region of the holding member 115 in the drill 101 is omitted from FIGS. 12 to 14.

The method of manufacturing a machined product in the present embodiment includes the following steps (1) to (4).

Figure 12:
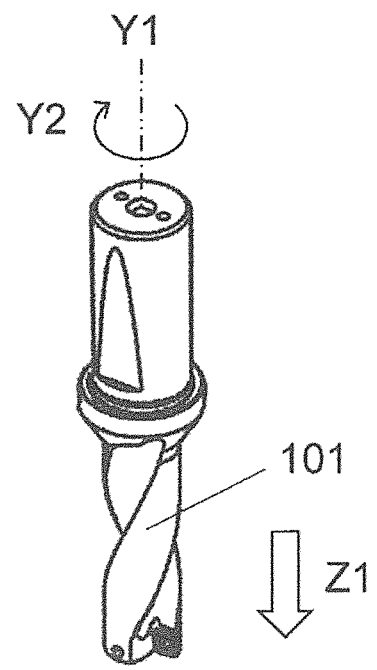
FIG. 12 is a schematic diagram illustrating a step in a method of manufacturing a machined product in an embodiment of the present disclosure.
Figure 12:
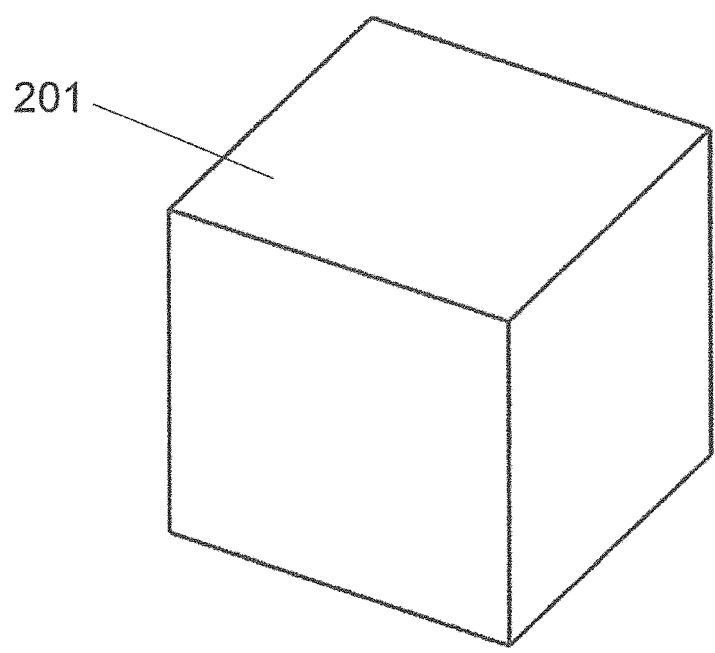
Figure 13:
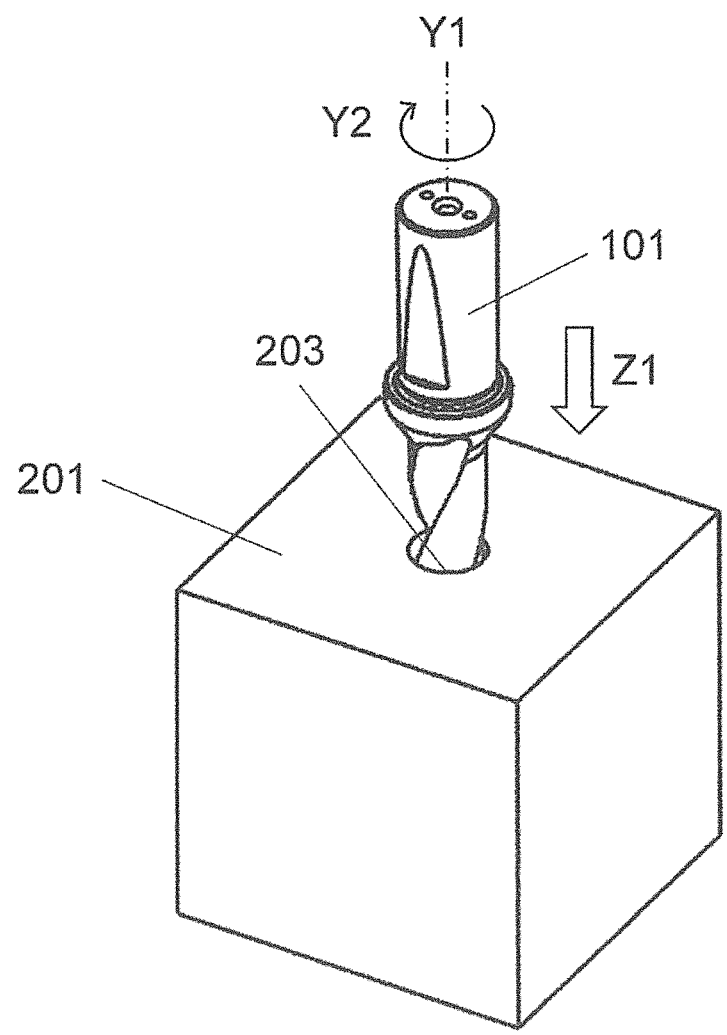
FIG. 13 is a schematic diagram illustrating a step in the method of manufacturing a machined product in the embodiment of the present disclosure.
Figure 14:
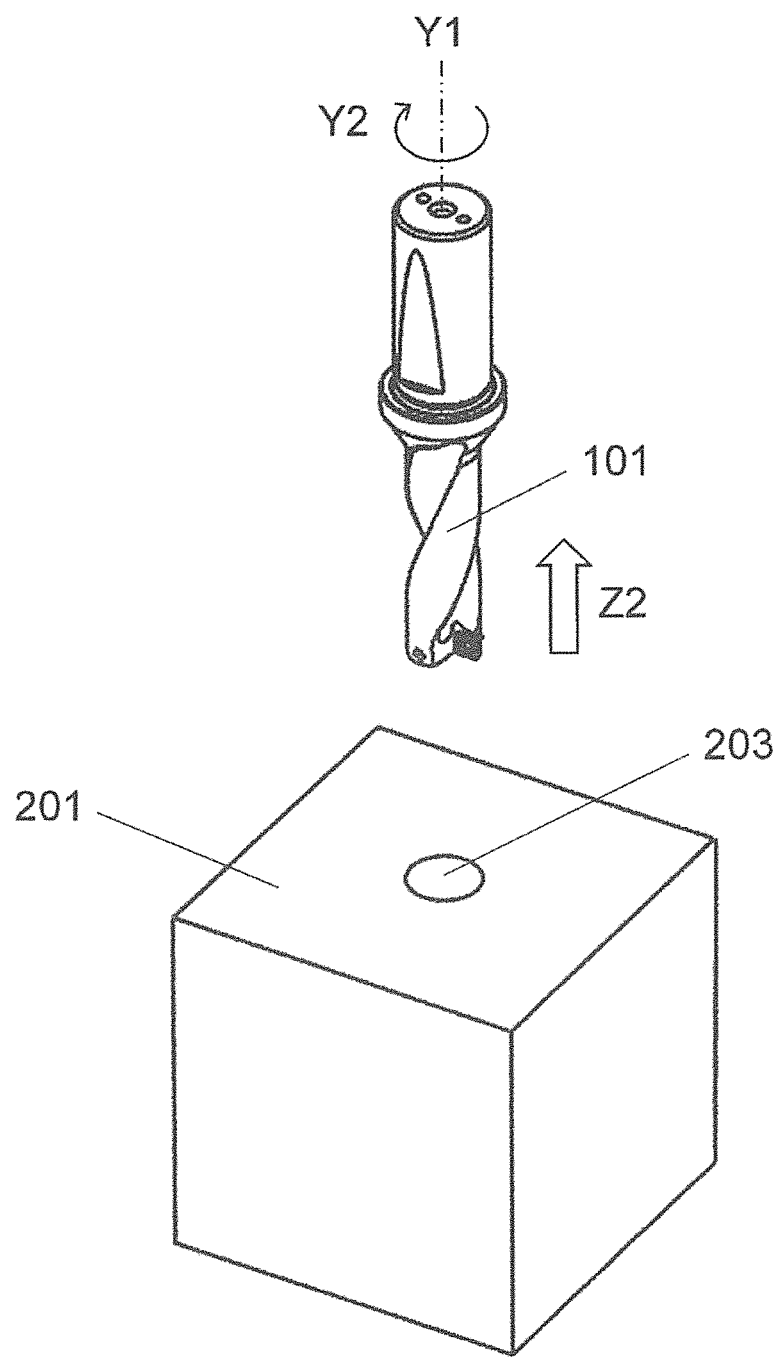
FIG. 14 is a schematic diagram illustrating a step in the method of manufacturing a machined product in the embodiment of the present disclosure.

(1) The step of putting the drill 101 (cutting tool) above a prepared workpiece 201 (refer to FIG. 12);

(2) The step of rotating the drill 101 around the rotation axis Y1 in a direction indicated by arrow Y2, and bringing the drill 101 closer to the workpiece 201 in Z1 direction (refer to FIGS. 12 and 13);

(3) The step of forming a drilled hole 203 in the workpiece 201 by bringing the drill 101 further closer to the workpiece 201 so as to cause the cutting edge of the drill 101 being rotated to contact with a desired position of a surface of the workpiece 201 (refer to FIG. 13); and (4) The step of moving the drill 101 away from the workpiece 201 in Z2 direction (refer to FIG. 14).

Examples of materials of the workpiece 201 prepared in the step (1) include aluminum, carbon steel, alloy stee, stainless steel, cast iron, and nonferrous metals.

The step (2) is performable by, for example, fixing the workpiece 201 onto a table of the machine tool having the drill 101 attached thereto, and then bringing the drill 101 being rotated closer to the workpiece 201. In this step, the workpiece 201 and the drill 101 need to be relatively close to each other. Alternatively, the workpiece 201 may be brought near the drill 101.

In the step (3), a setting is preferably made so that a partial region on the rear end side of the cutting member of the drill 101 is not brought into contact with the workpiece 201, from the viewpoint of obtaining a well finished surface. In other words, excellent chip discharge performance is producible through the partial region by making the partial region serve as a chip discharge region.

Also in the step (4), the workpiece 201 and the drill 101 need to be relatively away from each other as in the case with the step (2). For example, the workpiece 201 may be moved away from the drill 101.

The machined product having the drilled hole 203 is obtainable through the steps as described above. With the method of manufacturing a machined product in the present embodiment, the use of the drill 101 makes it possible to carry out the cutting process while smoothly discharging the chips, thus leading to the machined product having the highly precise drilled hole 203.

When the foregoing cutting process of the workpiece 201 is performed a plurality of times, for example, when forming a plurality of drilled holes 203 in a single workpiece 201, it is necessary to repeat the step of bringing the cutting edge of the drill 101 into contact with different portions of the workpiece 201, while keeping the drill 101 rotated.

Although the embodiments of the present disclosure have been illustrated and described above, the present disclosure is not limited to the foregoing embodiments.

It is, of course, possible to make any optional ones insofar as they do not depart from the gist of the present disclosure.

DESCRIPTION OF THE REFERENCE NUMERAL 1 cutting insert
3 upper surface
3a corner part
3aa first corner part
3ab second corner part
3b side
3b1 side
5 lower surface
7 side surface
9 cutting edge
11 through hole
13 first cutting edge
13a outer peripheral side end
15 second cutting edge
17 third cutting edge
19 first inclined surface
21 second inclined surface
22a first top portion
22b second top portion
23 fourth cutting edge
25 fifth cutting edge
26 sixth cutting edge
101 drill
103 holder
103a front end
103b rear end
105 inner cutting edge insert (first cutting insert)
106 cutting edge
107 outer cutting edge insert
109 main body
111 first chip discharge flute (first flute)
113 second chip discharge flute (second flute)
115 holding member
117 cutting member
119 inner cutting edge pocket
121 outer cutting edge pocket
201 workpiece
203 drilled hole

What is claimed is:

1. A cutting insert, comprising:
   an upper surface comprising a first corner part and a second corner part adjacent to each other;
   a lower surface located on a side opposite to the upper surface;
   a side surface located between the upper surface and the lower surface; and
   a cutting edge located in a region which is located between the first corner part and the second corner part, and in which the upper surface intersects with the side surface, wherein
   the cutting edge comprises:
      a first cutting edge located at a side of the first corner part and having a curved shape;
      a second cutting edge located at a side of the second corner part and having a curved shape; and
      a third cutting edge located between the first cutting edge and the second cutting edge, having a curved shape, and comprising a midportion of the cutting edge; and
   the cutting edge is recessed toward the lower surface as going from each of the first corner part and the second corner part toward the midportion of the cutting edge in a side view; and
   each of a first radius of curvature of the first cutting edge and a second radius of curvature of the second cutting edge in the side view is smaller than a third radius of curvature of the third cutting edge in the side view.

2. The cutting insert according to claim 1, wherein
the first radius of curvature is greater than the second radius of curvature.

3. A cutting insert, comprising:
an upper surface comprising a first corner part and a second corner part adjacent to each other;
a lower surface located on a side opposite to the upper surface;
a side surface located between the upper surface and the lower surface; and
an edge located at an intersection of the upper surface and the side surface, the edge comprising a cutting edge located between the first corner part and the second corner part, wherein
the cutting edge has at least partially a curvilinear shape being recessed toward the lower surface as going from each of the first corner part and the second corner part toward a midportion of the cutting edge in a side view and toward a center of the upper surface as going from each of the first corner part and the second corner part toward the midportion of the cutting edge in a top view, and the cutting edge comprises:
  a first cutting edge located at a side of the first corner part, the first cutting edge having a first radius of curvature in the side view and a fourth radius of curvature in the top view;
  a second cutting edge located at a side of the second corner part, the second cutting edge having a second radius of curvature in the side view and a fifth radius of curvature in the top view; and
  a third cutting edge located between the first cutting edge and the second cutting edge, the third cutting edge having a third radius of curvature in the side view and a sixth radius of curvature in the top view;
the first radius of curvature and the second radius of curvature is smaller than the third radius of curvature,
the fourth radius of curvature is greater than the first radius of curvature,
the fifth radius of curvature is greater than the second radius of curvature, and
the sixth radius of curvature is greater than the third radius of curvature.

4. The cutting insert according to claim 3, wherein
the upper surface further comprises a first inclined surface which is located more inside than the cutting edge and inclined downward as going away from the cutting edge, and a second inclined surface which is located more inside than the first inclined surface and inclined upward as going away from the first inclined surface, and
a third distance between the third cutting edge and the second inclined surface is greater than each of a first distance between the first cutting edge and the second inclined surface and a second distance between the second cutting edge and the second inclined surface in the top view.

5. The cutting insert according to claim 4, wherein
the second inclined surface comprises a second top portion located at a side of the second corner part.

6. The cutting insert according to claim 5, wherein
the second inclined surface further comprises a first top portion located at a side of the first corner part, and
a height of the first top portion is identical to a height of the second top portion.

7. The cutting insert according to claim 3, wherein
each of the first cutting edge, the second cutting edge, and the third cutting edge has a circular arc shape in the side view, and
a second center of a circular arc of the second cutting edge is located further away from a third center of the circular arc of the third cutting edge than a first center of a circular arc of the first cutting edge in the side view.

8. The cutting insert according to claim 3, wherein
the cutting edge further comprises a fourth cutting edge located between the first corner part and the first cutting edge, and a fifth cutting edge located between the second corner part and the second cutting edge, and
each of the fourth cutting edge and the fifth cutting edge has a curvilinear shape being protruded upward in the side view.

9. The cutting insert according to claim 8, wherein
each of the fourth cutting edge and the fifth cutting edge has a circular arc shape in the side view.

10. The cutting insert according to claim 8, wherein
the cutting edge further comprises a sixth cutting edge located between the first corner part and the fourth cutting edge, and
the sixth cutting edge has a straight line shape parallel to the lower surface in the side view, and has a curvilinear shape being protruded outward in the top view.

11. A cutting tool, comprising:
a bar-shaped holder extending along a rotation axis; and
the cutting insert according to claim 3 which is attached to a front end of the holder, wherein
the holder comprises a chip discharge flute extending spirally around the rotation axis in a direction from the cutting insert toward a rear end side.

12. The cutting tool according to claim 11, further comprising:
a first cutting insert attached to an inner peripheral side in the front end of the holder, wherein
the cutting insert is attached to an outer peripheral side in the front end of the holder, and
a rotation locus of a cutting edge of the first cutting insert intersects with a rotation locus at an outer peripheral side end of the first cutting edge of the cutting insert.

13. A method of manufacturing a machined product, comprising:
rotating the cutting tool according to claim 11 around the rotation axis;
bringing the cutting tool being rotated into contact with a workpiece; and
moving the cutting tool away from the workpiece.

14. A cutting insert, comprising:
an upper surface comprising a first corner part and a second corner part adjacent to each other;
a lower surface located on a side opposite to the upper surface;
a side surface located between the upper surface and the lower surface; and
an edge located at an intersection of the upper surface and the side surface, the edge comprising a cutting edge located between the first corner part and the second corner part, wherein
the cutting edge has at least partially a curvilinear shape being recessed toward the lower surface as going from each of the first corner part and the second corner part toward a midportion of the cutting edge in a side view, and the cutting edge comprises:

a first cutting edge located at a side of the first corner part, the first cutting edge having a first radius of curvature in the side view;
a second cutting edge located at a side of the second corner part, the second cutting edge having a second radius of curvature in the side view;
a third cutting edge located between the first cutting edge and the second cutting edge, the third cutting edge having a third radius of curvature in the side view;
a fourth cutting edge located between the first corner part and the first cutting edge; and
a fifth cutting edge located between the second corner part and the second cutting edge;
the first radius of curvature and the second radius of curvature is smaller than the third radius of curvature, and
each of the fourth cutting edge and the fifth cutting edge has a curvilinear shape protruding upward in the side view.

15. The cutting insert according to claim 14, wherein each of the fourth cutting edge and the fifth cutting edge has a circular arc shape in the side view.

16. The cutting insert according to claim 14, wherein the cutting edge further comprises a sixth cutting edge located between the first corner part and the fourth cutting edge, and
the sixth cutting edge has a straight line shape parallel to the lower surface in the side view, and has a curvilinear shape being protruded outward in a top view.

17. The cutting insert according to claim 2 that is configured to rotate around a rotation axis, wherein the second cutting edge is farther from the rotation axis than the first cutting edge and the third cutting edge.

18. The cutting insert according to claim 17, wherein
the cutting edge has a curvilinear shape being recessed toward a center of the upper surface as going each of the first corner part and the second corner part toward the midportion of the cutting edge in a top view,
a first cutting edge has a fourth radius of curvature in the top view,
a second cutting edge has a fifth radius of curvature in the top view,
a third cutting edge has a sixth radius of curvature in the top view,
the fourth radius of curvature is greater than the first radius of curvature,
the fifth radius of curvature is greater than the second radius of curvature, and
the sixth radius of curvature is greater than the third radius of curvature.

19. The cutting insert according to claim 17, wherein
the cutting edge further comprises a fourth cutting edge located between the first corner part and the first cutting edge, and a fifth cutting edge located between the second corner part and the second cutting edge; and
each of the fourth cutting edge and the fifth cutting edge has a curvilinear shape protruding upward in the side view.

20. The cutting insert according to claim 19, wherein each of the fourth cutting edge and the fifth cutting edge has a circular arc shape in the side view.

* * * * *